June 5, 1956  J. A. BUSSARD  2,748,851
REFRIGERATOR CURTAINS
Filed Oct. 19, 1953  3 Sheets-Sheet 1

John Arthur Bussard
INVENTOR

BY Bush & Bush,
ATTORNEYS

June 5, 1956 — J. A. BUSSARD — 2,748,851
REFRIGERATOR CURTAINS
Filed Oct. 19, 1953 — 3 Sheets-Sheet 2
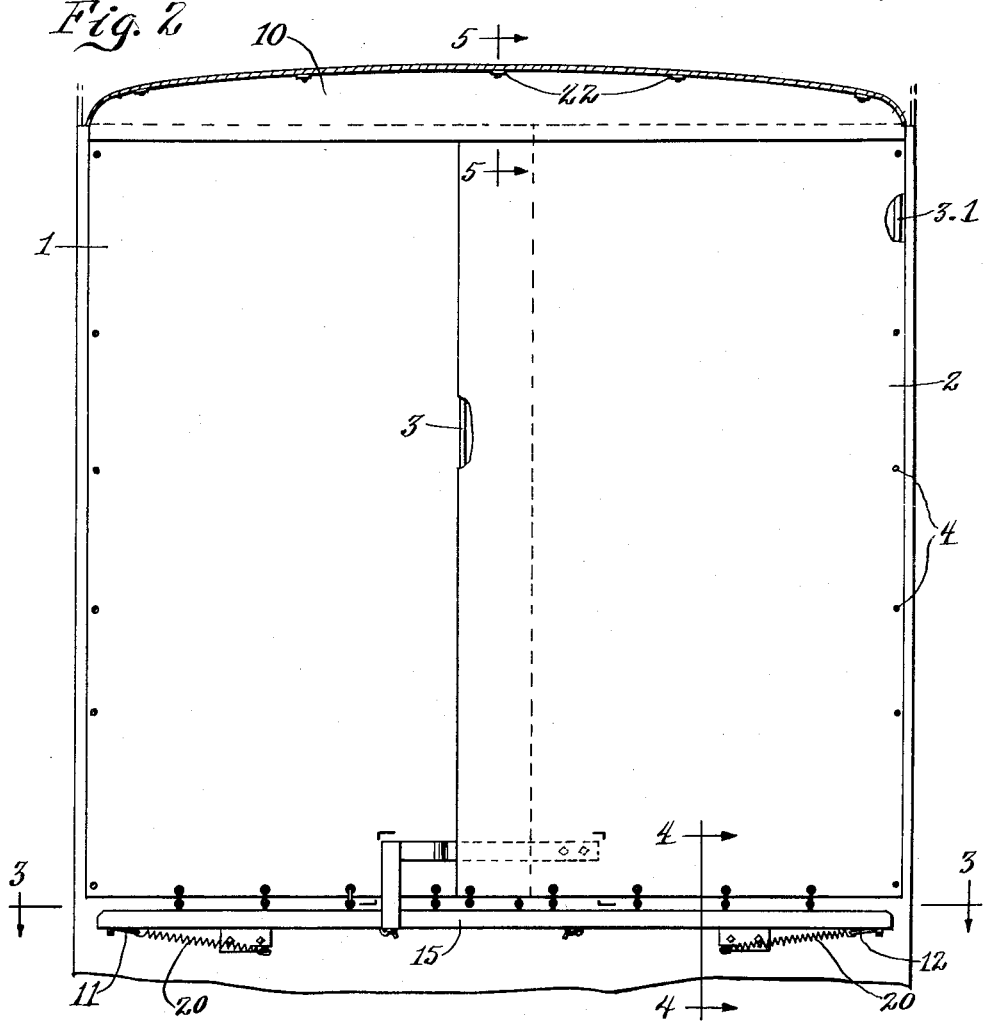
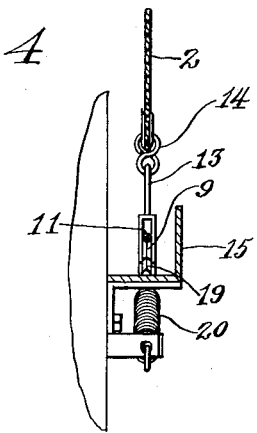
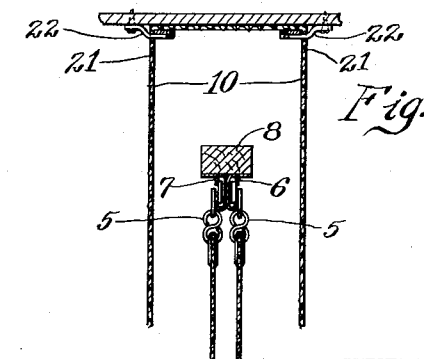
INVENTOR
John Arthur Bussard
BY Bush & Bush
ATTORNEYS June 5, 1956  J. A. BUSSARD  2,748,851
REFRIGERATOR CURTAINS Filed Oct. 19, 1953  3 Sheets-Sheet 3

John Arthur Bussard INVENTOR.

BY Bush & Bush,
His Attorneys.

United States Patent Office 2,748,851
Patented June 5, 1956

2,748,851

REFRIGERATOR CURTAINS

John Arthur Bussard, Rock Island, Ill.

Application October 19, 1953, Serial No. 386,788

4 Claims. (Cl. 160—126)

My invention relates to improvements in refrigerator curtains.

The objects of my invention are to provide improved curtain means for insulating the freight-carrying compartment of a truck or other conveyance for transporting milk, cream, ice cream, cheese, dairy products, fruits, ices, vegetables, and other articles of merchandise requiring a low temperature to preserve them from deterioration.

My invention may be applied to motor trucks, milk wagons and other similar conveyances having side walls, roof, floor and rear doors, compounded with heat resisting elements and with one or more adjustable insulating curtains of heat resistant material mounted at the front of the compartment for easy access and operation by the driver, and preferably includes a pair of curtains with their outer edges rigidly united to the frame or side walls of the truck and with their inner edges arranged to overlap a substantial distance at the middle.

The upper edges of the curtains are slidably mounted upon supporting rods carried by the body of the truck and the lower edges of the curtains are slidably mounted upon resilient parallel means preferably of wire cables which overlap at the middle.

At the top of the curtain valances of similar insulating material are mounted upon a suitable support carried by the ceiling of the compartment and extending downwardly several inches along both sides of the upper part of the curtains.

I accomplish these objects by the means shown in the accompanying drawings, in which—

Figure 2 is a front view of my curtains;

Figure 4 is a vertical section on the line 4—4 of Figure 2 showing the entire width of the curtains;

Figure 5 is a vertical section on the line 5—5 of Figure 2;

Similar numerals refer to similar parts throughout the several views.

Figure 1:
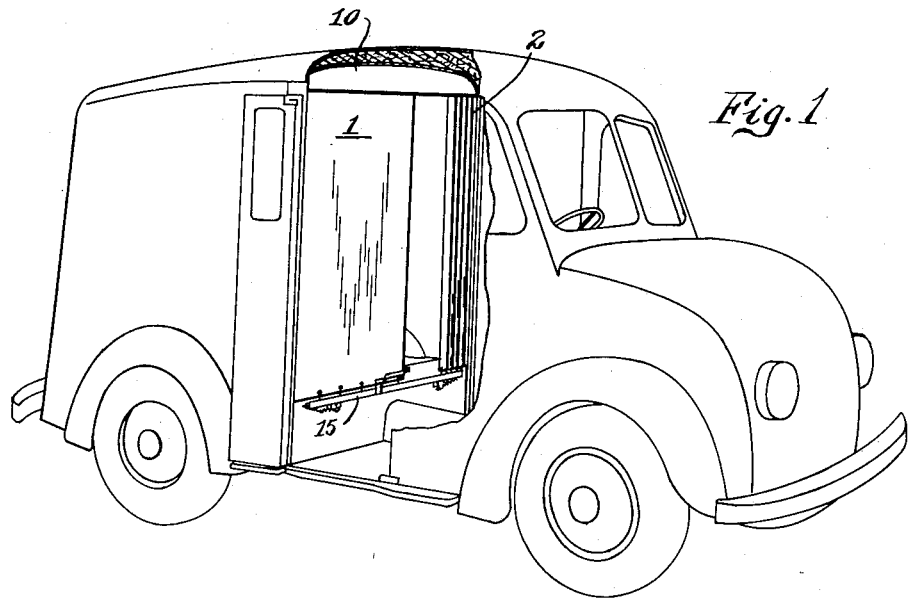
Figure 1 is a perspective of a vehicle showing curtains in place.
Figure 3:
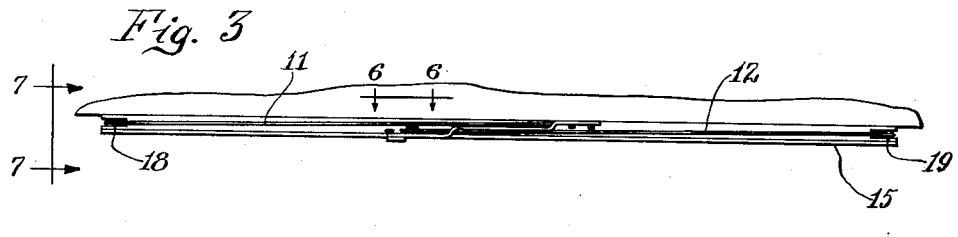
Figure 3 is a horizontal section on the line 3—3 of Figure 2.
Figure 6:
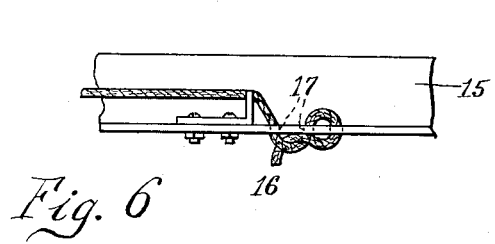
Figure 6 is a fractional section on the line 6—6 of Figure 3.
Figure 7:
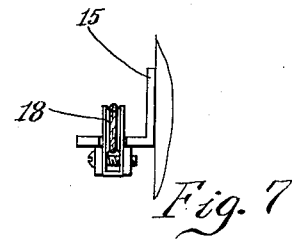
Figure 7 is an end view of Figure 3.
Figure 8:
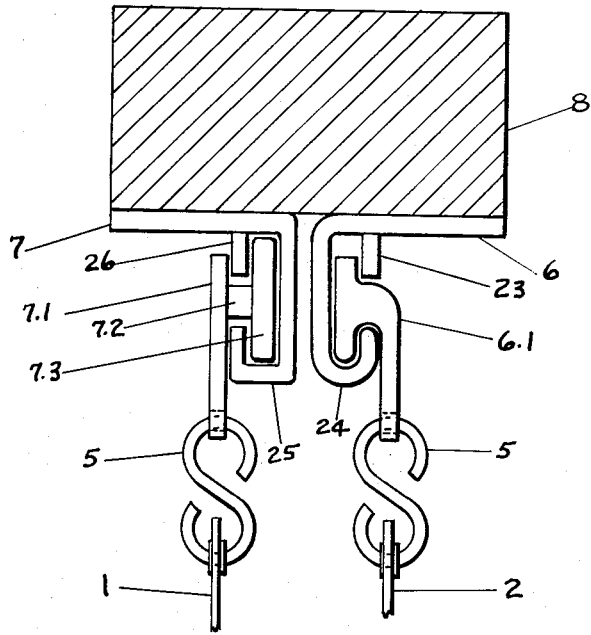
Figure 8 is an enlarged detail partly in section of the upper hangers for the curtain.
Figure 9:
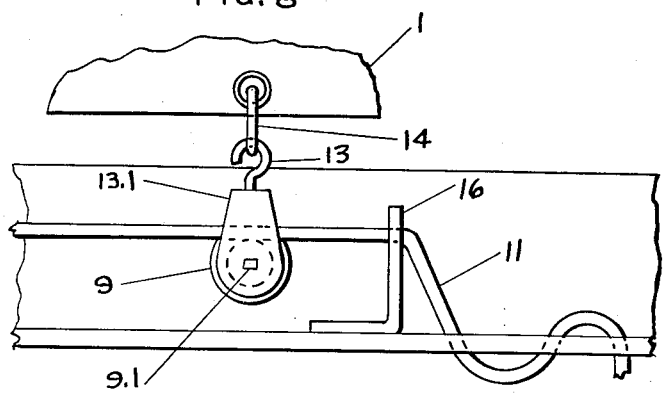
Figure 9 is an enlarged detail of the lower hangers for the curtain.

My invention includes curtains 1 and 2 of canvas or other suitable flexible material but having sufficient firmness to remain in place against the ordinary jars of motoring and lined with a suitable amount and form of heat-insulating material such as asbestos fibers, fibrous glass or any other fibrous material which will resist the transmission or passage of heat or cold.

The inner edges of the curtains are fitted with vertical rods 3 to stiffen the inner edges of the curtain. The outer edges may be tacked or nailed or otherwise secured to the side walls of the truck or wagon by suitable large-headed tacks, nails or screws 4, and may have rods 3.1 inserted therein.

The upper edges of the curtains may be hemmed or folded and have metal S-hooks 5 united thereto, all the S-hooks being hooked to carriers adapted to travel over carrier bars 6 or 7. The outer ends of the bars 6 and 7 are mounted upon a crossbar 8 mounted on the side walls of the truck.

The hangers for the upper portion of the curtain include annular bars 6 and 7. The bar 6 has a flat horizontal portion mounted upon the crossbar 8 with a downwardly extending portion 24 united thereto and its lower edge upturned to form a channel for the hangers. A small ridge 23 extends downwardly a short distance to prevent displacement of the hangers.

The hangers 6.1 have flat heads carried by the channelled portion 24 and retained from displacement by the ridge 23. The lower ends of the hangers 6.1 have bores formed in the lower end thereof which carry the upper hooks of S-shaped hooks 5 while the lower hook of each 5 passes through an eyelet in the top of the curtain 2 and suspends the curtain. The hangers 6.1 are arranged to travel freely in the channel lengthwise of the bar 6.

As an alternate form of hanger, I have shown the bar 7 with a channeled portion 25 and a small ridge 26 depending therefrom. The bar 7.1 has a pin or shaft 7.2 united thereto the inner end of which has journaled thereon a small wheel 7.3 which is adapted to roll along the channelled portion 25 of the bar 7. The bar 7.1 is provided with a bore at the lower end thereof in which the S-shaped hook 5 is mounted and the lower end of 5 passes through an eyelet in the upper end of the curtain 1 to sustain the curtain in vertical position.

A plurality of carriers 6.1 and 7.1 may be applied to the top of the curtain and spaced apart as necessary to afford ample means of support therefor.

The holders for the lower edges of the curtains are in the form of links 14 the upper part of which are secured in eyelets formed in the lower edges of the curtains. The lower part of the links 14 carry yokes or pulleys 13 through which the cables 11 and 12 pass over and upon grooved pulley wheels 9 whereby the lower edges of the curtains are normally retained or held in their lowermost position. The cables 11 and 12 are carried by an angle iron crossbar 15 secured in the lower part of the body. One end of each cable is supported at a given height by a horse or block 16 which is rigidly united to the angle iron bar 15 and the end of the cable may be fastened to the angle bar by being passed through a plurality of holes 17 which will be sufficient to secure it in place, or any suitable means.

The outer portions of the cables 11 and 12 pass over pulley wheels 18 and 19 which are mounted on the angle bar at the ends thereof. These portions of the cables then pass around under the angle bar and are engaged by coiled tension springs 20—20 arranged to exert an adjustable tension upon the cables in order to hold the lower ends of the curtains 1 and 2 in their position adjacent the angle bar.

The curtains when closed will overlap approximately a foot or more and are of heavy enough material so that their weight will hold them in place or return them to place whenever jarred out by the movement of the truck or by impact of a person.

At the top of the curtains a pair of valances 10—10 are secured of material similar to the curtains and which extend down several inches below the top of the curtains on opposite sides thereof to effectively prevent the circulation of air over the curtains. The upper edges of these valances are formed with a passageway or large hem which permits the introduction of two long narrow bars of metal 21—21 which may be fastened or held to the ceiling of the truck by metal clips 22. The clamping members 22 are arranged to hold the valances with their upper edges in close contact wtih the ceiling or hanging down so as to cover the upper portion of the curtains on both sides of the curtains or of a single curtain when only a single curtain is used.

In the operation of my curtain the sections 1 and 2 can be slid upon their carriers over to opposite sides of the truck so as to leave a wide open space or doorway to permit the introduction or the removal of the cases of milk or other products and the cakes or other portions of ice to be introduced on top or adjoining them. The curtains are then closely drawn and only opened when it is necessary for the driver to remove a portion of the load after which they will be manually closed and remain closed until the next stop.

Experience has shown that these curtains not only do not open automatically by the jarring movements of a truck as the sliding doors in common use frequently do, but also will readily yield to pressure in case any person is thrown or comes into sudden contact with them and will retain their original position as soon as such pressure ceases.

Experience has also shown that in the case of loads of milk carried by trucks provided with these curtains where a substantial amount of ice is placed with the cases of milk or resting upon them, instead of the ice being entirely melted and gone by the end of the trip, there will usually be a substantial amount of ice remaining in the freight compartment at the end of the trip. Likewise, the insulation afforded for the ice maintains the milk in condition so it will be cold when delivered by the driver.

Various modifications may be made in the form, material and proportions of the parts without departing from the spirit of my invention as expressed in the claims and I do not limit my claims to the precise forms shown in the drawings.

In some of the claims I use the term "laterally movable" to refer to the movement of the curtains toward or away from the side of the compartment.

I claim:

1. In a refrigerating compartment, a curtain suspended therein, resilient means for holding down the lower edge of the curtain including a crossbar mounted below the lower end of the curtain, a cable with one end rigidly attached to the crossbar and passing along the upper side of the bar and over a pulley at the opposite end of the bar and with its free end attached to a tension spring mounted upon the under side of the bar, a plurality of yokes having hooks adapted to engage eyelets formed in the lower edge of the curtain and carrying small pulley wheels adapted to engage the cable and travel along the under side thereof above the crossbar.

2. A closure for a refrigerating compartment of a truck including at the front end of the compartment vertical curtains of flexible fibrous material slidably mounted upon parallel tracks in two overlapping sections, each section having its outer edge united to its respective sidewall of the compartment and its inner edge arranged to overlap the other section substantially when closed, overlapping parallel supporting means adapted to support the curtains in vertical position when they are either closed or open and upon which the curtains are separably slidable, and resilient means to retain the lower ends of the curtains in their lowermost position whether open or closed, including a crossbar rigidly mounted below the lower edges of the curtains, a pair of cables mounted on the crossbar with one end of each cable attached to tension springs mounted upon the crossbar adapted to exert traction upon the cables, and links secured to the lower edges of the curtains carrying pulleys depending therefrom through which the cables respectively pass and adapted to secure the lower edges of the curtain in their lowermost position.

3. A curtain fixture including a bar rigidly mounted at the foot of a laterally movable curtain and parallel therewith, a cable mounted upon the bar and spaced pulley-carrying links united to the lower end of the curtain, a grooved wheel in each pulley adapted to roll along and under the cable when and as the curtain is moved laterally from closed to open position or from open to closed position.

4. A curtain fixture as described in claim 3, and a tension spring to which one end of the cable is united adapted to hold the cable under tension.

References Cited in the file of this patent

UNITED STATES PATENTS

| | | |
|---|---|---|
| 174,400 | Abbot | Mar. 7, 1876 |
| 1,606,632 | Harris | Nov. 9, 1926 |
| 1,658,271 | Wilson | Feb. 7, 1928 |
| 2,007,595 | Brykczynski et al. | July 9, 1935 |
| 2,152,474 | Gromes | Mar. 28, 1939 |
| 2,781,867 | Krohnert | Jan. 8, 1952 |
| 2,615,514 | Hickling et al. | Oct. 28, 1952 |
| 2,621,724 | Bergstrom | Dec. 16, 1952 |
| 2,705,566 | Ford et al. | Apr. 5, 1955 |